July 4, 1950
H. J. CARLIN
2,513,843
FREQUENCY RELAY INDEPENDENT OF THE MAGNITUDES
OF ENERGIZATION THEREOF
Filed July 26, 1946
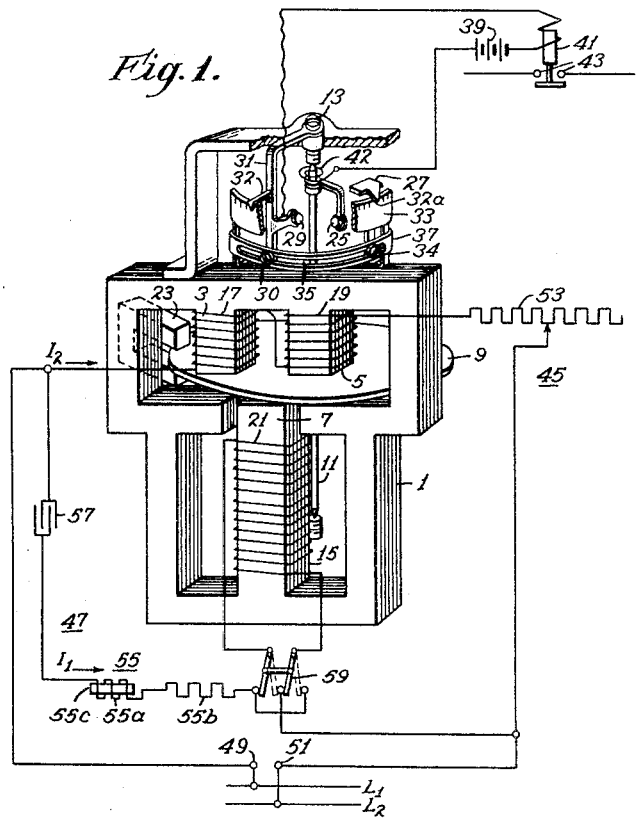
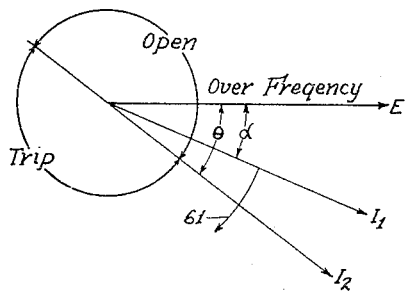
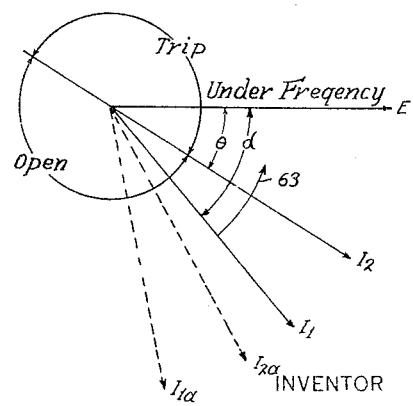
WITNESSES:
Edward Michaels
Leon J. Faza
INVENTOR
Herbert J. Carlin.
BY C. L. Freedman
ATTORNEY Patented July 4, 1950

2,513,843

UNITED STATES PATENT OFFICE 2,513,843

FREQUENCY RELAY INDEPENDENT OF THE MAGNITUDES OF ENERGIZATION THEREOF

Herbert J. Carlin, East Orange, N. J., assignor to Westinghouse Electric Corporation, East Pittsburgh, Pa., a corporation of Pennsylvania Application July 26, 1946, Serial No. 686,342

2 Claims. (Cl. 175—335)

This invention relates to an electrical device responsive to the phase relationship between two alternating quantities and it has particular relation to such an electrical device wherein the aforesaid phase relationship is dependent on a variable quantity, such as the frequency of a source of alternating electrical energy.

In my patent application Serial No. 527,059, filed March 18, 1944, now Patent 2,404,945, I disclosed a relay suitable for response to variations in frequency of an alternating current circuit. In this relay, an induction type directional element is provided wherein two windings, when energized by currents differing in phase relative to each other, produce a shifting magnetic field in an air gap. An electroconductive armature is positioned in the air gap for rotation in response to the shifting magnetic field and may be employed for operating an electrical switch or for any other desired purpose. The windings of the induction type directional element are connected respectively in two parallel arms of an electrical circuit which is energized in accordance with the voltage of a source of alternating electrical energy. The impedances of the arms include reactive components designed to provide a phase relationship between currents flowing in the two arms which varies as a function of the frequency of the voltage applied to the electrical circuit. The range of variation is such that the currents in the two parallel arms are in phase at a predetermined frequency value. When the frequency passes through the aforesaid predetermined value, a reversal occurs in the direction of the torque applied to the armature of the directional element. This reversal in torque may be employed to actuate a switch associated with the armature.

By inserting a suitable adjustable impedance in either or both of the parallel arms of the electrical circuit, the value of frequency at which the currents in the two arms are in phase readily may be adjusted. Such adjustments have substantially no effect on the timing characteristics of the device, and the time delay of the device may be adjusted conveniently by adjustment of the distance between the fixed and movable contacts of the switch actuated by the armature element. By correct construction of the impedances in the two parallel arms, errors introduced by variations in applied voltage and in ambient temperature may be held to extremely small values.

The temperatures of the various components of the device are dependent not only on ambient temperature but on deenergization of the device. Since reactors inherently have some resistance, the temperatures of electrical components, such as resistors, capacitors and inductors, are dependent in part on the currents flowing through such components and on the heat radiation, convection and conduction properties of the various components. Because of the variations in temperatures of the components due to the passage of current therethrough, I have found that the performance of relay depends to an appreciable extent on the immediately preceding energization of the relay. For example, if the relay is calibrated after it has been energized for a considerable period of time and the relay thereafter is deenergized, a false operation of the relay may occur because of the change in the impedance of the components due to the cooling of the relay.

In accordance with the invention, performance of the relay is made substantially independent of the history of the energization of the relay. To this end, the impedance in one of the aforesaid parallel arms is designed to compensate varying impedance in the other parallel arm resulting from a change in the magnitude of energization of the relay. In accordance with one embodiment of the invention, a resistor having a substantial temperature coefficient of resistance is employed for correction purposes. This impedance is designed for operation at a temperature substantially in excess of the temperatures normally reached for similar resistors employed in relays. For this reason, the change in resistance of the resistor in response to energization thereof is substantial when compared to the change in resistance thereof resulting from variations in ambient temperature.

It is, therefore, an object of the invention to provide an improved frequency relay which is responsive to the phase relationship between a plurality of alternating quantities and which is substantially independent of variations in the magnitude of energization thereof.

Other objects of the invention will be apparent from the following description taken in conjunction with the accompanying drawing, in which:

Fig. 1 is a schematic view, with parts in perspective and parts broken away, of an electrical system embodying a relay designed in accordance with the invention; and Figs. 2 and 3 are vector diagrams showing voltage and current relationships in the system of Fig. 1.

Referring to the drawing, Figure 1 shows an electrical device which is responsive to the phase relationship between a plurality of alternating currents. This device includes a directional element which is illustrated as of the induction type. A suitable directional element may include a magnetic structure 1 having a pair of pole pieces 3 and 5 and a third pole piece 7 which is spaced from the aforesaid pair to define an air gap. An electroconductive armature 9 is positioned in the air gap and mounted on a shaft 11 for rotation in suitable bearings 13 and 15. Conveniently, the armature 9 may be formed of an electroconductive material such as copper or aluminum.

Windings 17 and 19 are positioned on the pole pieces 3 and 5. In addition, a winding 21 is positioned on the pole piece 7. As well understood in the art, when the windings 17 and 19, on the one hand, and the winding 21, on the other hand, are energized by alternating currents which are displaced in phase from each other, magnetic fluxes are produced which are displaced in time phase, and thus effectively a shifting magnetic field is produced in the air gap between the pole pieces. This shifting magnetic field is effective for rotating the armature 9. The direction of rotation of the armature depends on the direction of phase displacement of the current flowing through the windings 17 and 19 from the current flowing through the winding 21. Rotation of the armature 9 may be damped in a conventional manner by means of a permanent magnet 23 which is positioned to direct magnetic flux through the armature.

Rotation of the armature 9 may be employed in any desirable manner. For the purpose of illustration, the shaft 11 carries a contact 25 which is movable between a stop 27 and a contact 29 in response to rotation of the shaft 11. The contact 29 or the stop 27, or both of these elements may be adjustable about the axis of the shaft 11. To permit such adjustment, the contact 29 is mounted on a lever 31 which is rotatable about the axis of the shaft 11. The arm 31 may be secured in any position of adjustment by means of a clamping screw 30 which passes through a slot 35 in a cylindrical guide strip 37. Adjustment of the stop 27 may be effected in a similar manner by providing a clamping screw 34 therefor. The lever 31 and the stop 27 may carry pointers 32 and 32a which overlie a scale 33 suitably calibrated to indicate the position or adjustment of the contact 29 or the stop 27. In most cases adjustment of the stop 27 alone suffices for adjusting the relay timing.

Relative movement of the contacts 25 and 29 may be employed for any suitable control function. In the specific embodiment of Fig. 1, engagement of the contact 25 with the contact 29 completes a circuit connecting a source of electrical energy, such as a battery 39 to a solenoid operated contactor 41. The contact 25 may be suitably insulated from the shaft 11 and may be connected to the battery 39 through a flexible, conductive spiral spring 42 which surrounds the shaft 11. Energization of the contactor 41 closes a pair of contacts 43 which may be the tripping contacts of an associated circuit breaker (not shown).

In order to energize the windings associated with the magnetic structure 1, the windings are connected in the two arms 45 and 47 of an electrical circuit having two terminals 49 and 51. The windings 17 and 19, together with a resistor 53, are connected in series in the arm 45. The winding 21, together with a resistor 55 and a capacitor 57, are connected in series in the arm 47. The arms 47 and 45 provide paths respectively for the currents $I_1$ and $I_2$. The terminals 49 and 51 may be connected for energization of the electrical circuit in accordance with the voltage across the conductors $L_1$ and $L_2$ of a source of alternating electrical energy. Instantaneous directions of flow for the currents $I_1$ and $I_2$ are indicated by the arrows in Fig. 1.

To provide a manual control for the direction of rotation of the armature 9 when the windings associated therewith are suitably energized, a reversing switch 59 is provided for connecting the winding 21 into the arm 47 of the associated electrical circuit. If it is desired to change the direction of the rotation of the armature 9 at any time, the switch 59 may be actuated from the position illustrated in full lines in Fig. 1 to the position illustrated in dotted lines.

The operation of the system illustrated in Fig 1 can be explained best by reference to the vector representations of Figs. 2 and 3. Let it be assumed first that the electrical device of Fig. 1 is an overfrequency relay which is intended to close its contacts 25 and 29 when the frequency of the alternating voltage E applied thereto exceeds a predetermined value. The voltage E and the currents $I_1$ and $I_2$ which flow through the arms 47 and 45 in response to the voltage E are illustrated in Fig. 2. When the frequency of the voltage E is at its normal value, which is below the aforesaid predetermined value at which the relay is intended to trip, the impedances of the arms 45 and 47 may be designed to produce lagging currents similar to those represented in Fig. 2. For example, the current $I_1$ may lag the voltage E by an angle $\alpha$, whereas the current $I_2$ lags the voltage E by an angle $\theta$. Inasmuch as the currents $I_1$ and $I_2$ are displaced from each other by the angle $(\theta - \alpha)$ a shifting magnetic field is produced in the air gap of the relay and a torque is applied to the armature 9. For the conditions thus far assumed, the reversing switch 59 is so connected that the movable contact 25 is urged by the aforesaid torque against the stop 27.

As the frequency of the voltage E increases, the reactance of the capacitor 57 decreases. The reactance of the winding 21 increases and the current $I_1$ becomes more lagging with respect to the voltage. The direction of movement of the vector $I_1$ in Fig. 2 as the frequency increases is represented by an arrow 61. The vector $I_2$ will also tend to lag slightly, but its movement is negligible with respect to $I_1$, and hence may be assumed fixed in position. By inspection of Fig. 2, it will be observed that as the vector $I_1$ moves in the direction of the arrow 61 in response to an increase in the frequency of the voltage E, it reaches a position wherein the currents $I_1$ and $I_2$ are in phase. This is assumed to occur when the frequency of the voltage E is at a predetermined value above which the movable contact 25 is to engage the contact 29 of the relay. When the currents $I_1$ and $I_2$ are in phase, no torque is applied to the armature 9. However, if the frequency of the voltage E continues to increase above the aforesaid predetermined value, the value of the angle $\alpha$ exceeds that of the angle $\theta$ and a torque again is applied to the armature 9. It should be noted that since the current $I_1$ has moved from a position wherein it leads the current $I_2$ to a position wherein it lags the current $I_2$, the direction of the torque applied to the armature 9 reverses and the movable contact 25 is urged from the stop 27 into engagement with the fixed contact 29. The time required for the movable contact to engage the fixed contact depends on the angular distance about the shaft 11 between the fixed contact 29 and the stop 27 against which the movable contact normally rests, the strength of the permanent magnet 23 and the value of the torque applied by the magnetic structure 1 and associated windings to the armature 9. For any setting of the stop 27 relative to the fixed contact 29, the relay has an inverse time delay with respect to the excess in frequency above the predetermined value at which the relay is to operate. In the case of the overfrequency relay, the greater the difference between the actual frequency of the voltage E and the predetermined frequency above which the relay is to operate, the faster the relay closes its contacts.

From the foregoing discussion, it will be appreciated that as long as the current $I_1$ lies within the angular range marked "open" in Fig. 2, the movable contact 25 is urged against its stop 27. When the current $I_1$ lies within the angular range marked "trip" in Fig. 2, the movable contact 25 is urged toward the fixed contact 29.

Operation of the relay occurs when the current $I_1$ is adjacent to the current $I_2$. As long as the values of inductance, capacitance and resistance of the two arms 45 and 47 are independent of voltage, the operating point of the relay also is substantially independent of voltage since it only depends on the phase angle between currents, and not on their magnitudes. Because the magnetic structure 1 has a magnetic permeability which may vary in accordance with the density of magnetic flux therein, the inductances of the windings may change somewhat in response to changes in applied voltage. However, such changes may be minimized by operating the iron well below saturation, and any small changes which may occur tend to swing both currents $I_1$ and $I_2$ in the same direction with respect to the voltage E (Fig. 2) and consequently do not change appreciably the operating point of the relay. For example, in a relay actually constructed, it was found that a 10% change in voltage resulted in a change in the frequency at which the relay operated of only 1% of the frequency range. That is, a 60–70 cycles per second relay indicated an error of only .01×10=.1 cycle per second. This small voltage error may be substantially eliminated as shown in my aforesaid application, but in most applications an error of this magnitude is not objectionable.

Let it be assumed next that the relay is to close its contacts when the frequency drops below a predetermined value. When the frequency of the voltage is below the predetermined value, the vector relationships may be similar to those illustrated in Fig. 3. It will be noted that the current $I_2$ now leads the current $I_1$. The reversing switch 59 is so positioned that a torque applied to the armature 9 when the vectors of the currents $I_1$ and $I_2$ occupy the positions illustrated in Fig. 3 urges the movable contact 25 against the stop 27. As the frequency drops, the reactance of the capacitor 57 increases and the current $I_1$ becomes less lagging. At the predetermined value of frequency above which the relay is to operate, the current $I_1$ is substantially in phase with the current $I_2$. The direction of rotation of the current $I_1$ as the frequency drops is represented in Fig. 3 by an arrow 63.

If the frequency drops below the aforesaid predetermined value, the current $I_1$ leads the current $I_2$ and the direction of the torque applied to the armature 9 reverses to urge the movable contact 25 into engagement with the contact 29. The relay operates with a time delay similar to that discussed for overfrequency operation.

The effect of variations in ambient temperature now may be considered. In response to a change in temperature, the inductances of the windings 17, 19 and 21 may change slightly. However, such changes tend to rotate the vectors $I_1$ and $I_2$ of Figs. 2 and 3 in the same direction with respect to the voltage E. Consequently, such changes in inductance are to a substantial extent self-compensating. Resistors having substantially a zero temperature coefficient of resistance and capacitors having substantially a zero temperature coefficient of capacitance are available. Consequently, by selecting suitable resistors and capacitors, the relay illustrated in Fig. 1 may be made substantially free of errors introduced by ambient temperature.

In an electrical relay embodying the invention which was constructed and tested, it was found that a capacitor having a zero temperature coefficient of capacitance in association with suitably selected resistors provided a frequency relay wherein the tripping frequency varied only slightly with variations in relay temperature. Even better performance was obtained by employing a capacitor having a temperature variation of capacitance of −.04% per degree centigrade, to compensate for the variation in resistance of the copper used to wind coils 17, 19, 21. Capacitors having a negative temperature variation of this magnitude are readily available on the market. In the relay employing a capacitor having a negative temperature variation of capacitance and adjusted to trip at a frequency of 55 cycles per second, it was found that the tripping frequency varied less than plus or minus $\frac{1}{10}$ of a cycle per second over a temperature range of −20 to 65° C.

In order to vary the frequency at which the relay trips, one of the resistors 53 or 55 may be adjustable. In Fig. 1, the resistor 53 is indicated as being adjustable for this purpose. Referring to Fig. 2, it will be observed that the effect of an increase in the resistance value of the resistor 53 is to decrease the value of the angle $\theta$. This decreases the value of the frequency at which the currents $I_1$ and $I_2$ are in phase. Consequently, by adjustment of the resistor 53, the tripping frequency of the relay may be adjusted over a suitably range, such as 10 cycles per second. For example, a relay was constructed to operate at any frequency within a range between 50 and 60 cycles per second. Adjustment of the relay within this range has little effect on other characteristics of the relay.

Variations in the magnitude of energization of the relay may result in improper operation of the relay unless the relay is designed properly to compensate for such variations. For example, let it be assumed that the relay of Fig. 1 is designed for operation as an under-frequency relay and that it is calibrated after it has been energized for a time sufficient for the various electrical components, such as resistors, capacitors and inductors to reach stable temperatures. Under such conditions, the vector diagram of Fig. 3 illustrates the phase relationship existing between the current $I_1$ and $I_2$. Let it be assumed next that the relay is deenergized for a time sufficient for the relay to cool substantially to the ambient temperature. Since the windings 3 and 5 are formed of copper, the resistance of these windings decreases appreciably as the windings cool. Since the resistance of the windings represents an appreciable percentage of the resistance of the resistor 53, the cooling of the windings results in a substantial decrease in the ratio of resistance to inductance of the arm 45. Consequently, if the relay is energized after it has cooled to the ambient temperature, the position of the current $I_2$ immediately after such energization may be as represented by the dotted vector $I_{2a}$.

The resistor 55 has a large value of resistance. Consequently, variations in the resistance of the winding 21 in response to a decrease in temperature thereof does not appreciably affect the ratio of resistance to inductance in the arm 47. For this reason, the current $I_1$ does not change appreciably from the position illustrated in Fig. 3.

It will be noted that the vector $I_{2a}$ lags the vector representing the current $I_1$. This means that the torque applied to the armature 9 is in a direction such that the contacts 25 and 29 are brought into engagement. Such engagement occurs despite the fact that the frequency of the energization applied to the relay is unchanged. Consequently, until the relay has had an opportunity to reach a stable operating temperature, false operation of the relay may result.

In order to make the relay substantially independent of the immediately preceding history of the magnitude of its energization, the resistor 55 may be divided into two components 55a and 55b. The portion 55b may be constructed of a material having a substantially zero coefficient of resistance and preferably represents a substantial percentage of the total resistance in the arm 47.

The portion 55a represents a resistor having a substantial positive temperature coefficient of resistance. For example, this resistor may be constructed of a nickel iron alloy having a temperature coefficient of resistance at 20° C. of .0045 ohm per ohm, per degree centigrade.

If the relay of Fig. 1 which includes the resistor 55a is calibrated after it is energized and has reached a stable operating temperature and is thereafter deenergized and permitted to cool substantially to the ambient temperature, the characteristics of the relay at the time of reenergization are such as to direct a current through the windings 17 and 19 having the phase position represented by the vector $I_{2a}$. However, in cooling, the resistor 55a substantially decreases the resistance present in the arm 47, thereby decreasing the ratio of resistance to inductance in the arm 47. Consequently, immediately following reenergization of the relay, the current flowing through the winding 21 will have a phase position represented by the vector $I_{1a}$ in Fig. 3. This vector $I_{1a}$ lags the vector $I_1$. It will be noted that the phase relationship of the vectors $I_{1a}$ and $I_{2a}$ is substantially the same as the phase relationship of the vectors $I_1$ and $I_2$. Consequently, the performance of the relay of Fig. 1 is substantially independent of the history of the magnitude of energization of the relay immediately preceding the time at which the performance of the relay is studied. It will be understood that as the components of the relay 1 heat to their normal operating temperatures in response to currents flowing therethrough, the vectors $I_{1a}$ and $I_{2a}$ shift to the positions illustrated respectively by the vectors $I_1$ and $I_2$ in Fig. 3.

Preferably, the resistor 55a is designed to operate when energized at a temperature considerably higher than the temperature of resistors normally employed in such relay circuits. The higher the operating temperature of the resistor 55a, the greater will be the effect of the change in resistance thereof in response to a change in current therethrough. This means that the total resistance introduced by the resistor 55a may have a small value and may represent a small percentage of the total resistance of the arm 47. Such a proportioning of the resistor 55a does not affect appreciably the previously discussed compensation of the relay for variations in ambient temperatures.

Although the values used may vary appreciably, satisfactory results have been obtained from a resistor 55a designed to operate with a 50° C. rise above ambient temperature. The resistor may have a resistance value of 200 ohms when operating 50° C. above ambient temperature and a value of 160 ohms when operating at ambient temperature. To obtain the elevated operating temperature, the resistor may be constructed of fine resistance wire wound on an insulating spool 55c having poor heat conducting and radiation properties. If the spool is formed of porcelain, heat radiation may be inhibited by decreasing as much as possible the radiating surface of the spool. To this end, a solid spool may be employed and flanges omitted. If desired, a material with still poorer heat conducting properties, such as a phenolic resin, may be employed.

Although the invention has been described with reference to certain specific embodiments thereof, numerous modifications are possible. Therefore, the invention as defined in the appended claims is intended to cover all modifications embodying the invention.

I claim as my invention:

1. In an electrical relay, a directional element comprising a first winding, a second winding, and means directionally responsive to the direction of deviation of the phase relationship between alternating currents traversing said windings from an in-phase relationship, first means connecting a first one of said windings to a pair of terminals, second means connecting a second one of the windings to said terminals, whereby said windings may be energized in parallel from a common source of alternating current, at least one of the connecting means including a frequency-responsive reactance element for controlling the phase-relationship between currents traversing the windings, said first means and the first winding having a ratio of resistance to reactance which varies as a function due to the change in temperatures of the first means and the first winding as a result of self heating by current flowing therethrough when an alternating voltage is applied to the terminals, said second means including a resistor designed for operation at a temperature reached by self heating due to current flowing therethrough substantially higher than the temperature of operation of the resistance of said first means under normal conditions of energization thereof, said resistor having a substantial temperature coefficient of resistance, said second winding and the second means including the resistor having a resultant ratio of resistance to reactance which varies substantially in accordance with said function due to the change in temperatures of the second means and the second winding as a result of self heating by current flowing therethrough when said alternating voltage is applied to the terminals.

2. An electrical relay as claimed in claim 1 wherein the frequency-responsive reactance element is a capacitor and said second means includes a resistor having a substantially zero temperature coefficient of resistance and having a resistance magnitude substantially larger than that of the first-named resistor.

HERBERT J. CARLIN.

REFERENCES CITED

The following references are of record in the file of this patent:

UNITED STATES PATENTS

| Number | Name | Date |
| --- | --- | --- |
| 649,008 | Steinmetz | May 8, 1900 |
| 1,895,357 | Warrington | Jan. 24, 1933 |
| 2,074,145 | Emmerling | Mar. 16, 1937 |
| 2,083,387 | Merrill | June 8, 1937 |
| 2,377,596 | Williams | June 5, 1945 |
| 2,404,945 | Carlin | July 30, 1946 |